United States Patent

[11] 3,592,267

| [72] | Inventors | Morgan Ashley Stainback;<br>Evan Hoskins Street, Jr., both of Houston, Tex. |
|---|---|---|
| [21] | Appl. No. | 837,182 |
| [22] | Filed | June 27, 1969 |
| [45] | Patented | July 13, 1971 |
| [73] | Assignee | Shell Oil Company<br>New York, N.Y. |

[54] METHOD OF CONSOLIDATING AN UNCONSOLIDATED SAND
7 Claims, 2 Drawing Figs.

[52] U.S. Cl. .................................................. 166/294
[51] Int. Cl. .................................................. E21b 33/138
[50] Field of Search ..................................... 166/292, 293, 294, 295, 273, 274; 61/36

[56] References Cited
UNITED STATES PATENTS

| 2,025,948 | 12/1935 | Jorgensen | 166/292 |
| 2,274,566 | 2/1942 | Sullivan | 61/36 UX |
| 3,175,611 | 3/1965 | Hower | 166/292 |
| 3,291,214 | 12/1966 | Hower | 166/29 X |
| 3,371,712 | 3/1968 | Adams | 166/295 |

*Primary Examiner*—Stephen J. Novosad
*Attorneys*—Louis J. Bovasso and J. H. McCarthy

ABSTRACT: A method of consolidating an unconsolidated sand disposed in an incompetent formation by treating the formation with an emulsion of an aqueous solution of an alkali metal silicate in a hydrocarbon liquid and an aqueous solution containing a silicate precipitator.

3,592,267

INVENTORS:
MORGAN A. STAINBACK
EVAN H. STREET JR.
BY: Louis J Bovasso

THEIR ATTORNEY

METHOD OF CONSOLIDATING AN UNCONSOLIDATED SAND

BACKGROUND OF THE INVENTION

1. Field of the Invention

This invention relates to treating incompetent or unconsolidated formations such as unconsolidated subsurface formations; and, more particularly, to treatment of loose or incompetent earth formations surrounding well boreholes so as to consolidate such formations into a permeable, thermal- and hydrolytic-resistant consolidated formation for improved and efficient recovery of fluids therefrom.

2. Description of the Prior Art

It is well known that many difficulties are encountered in producing or recovering fluids from incompetent earth formations due to collapsing or sloughing of the walls of well boreholes extending into such formations. Numerous means have been employed to alleviate this problem.

Among the methods and devices used to prevent collapsing and sloughing of unconsolidated formations is the use of perforated pipe liners, gravel packing or tubular screens or by injecting resin-forming materials such as phenol-formaldehyde resins or epoxide resins which function as bonding and consolidating agents for weak formations. Another method employed involves subjecting the incompetent formations to elevated temperatures so as to cause fusion of constituents therein e.g. silica sand particles to provide bonding agents. Still another means is to form carbonized or coked materials which act as binders to hold the formations as an integral consolidated mass. Essentially these methods and means for consolidating incompetent earth formations have serious limitations as, for example, the mechanical devices discussed hereinabove tend to become plugged and generally are incapable of preventing fine particles from entering the production well borehole. Also, these devices require cleaning and constant attention. The use of resin consolidating materials requires special equipment and a treatment process necessitating the presence of a drilling rig. Such a process is generally time-consuming and costly. In essence, the same objections apply to thermal means of consolidating formations as mentioned hereinabove or other similar means known to the art. Thus, conventional thermal and chemical means of consolidating loose or incompetent formations are generally inefficient, ineffective, costly and generally cause a decrease in the permeability of the treated formation. Also, such methods lack desired resistance to changes in stress, strains and pressure and temperature conditions normally encountered in producing fluids from such formations.

SUMMARY OF THE INVENTION

It is an object of this invention to provide an improved method of consolidating loose or incompetent subsurface formations.

It is a further object of this invention to consolidate unconsolidated formations in a manner providing adequate porosity and strength in the treated formation at comparatively low cost.

It is a still further object of this invention to provide an improved method of treating an unconsolidated or incompetent formation so as to form highly permeable consolidated sand within the formation.

These and other objects are preferably carried out in such incompetent formations by injection of an emulsion of an aqueous solution of an alkali metal silicate in a hydrocarbon liquid and an aqueous solution containing a silicate precipitator.

DESCRIPTION OF THE PREFERRED EMBODIMENT

Figure 1:
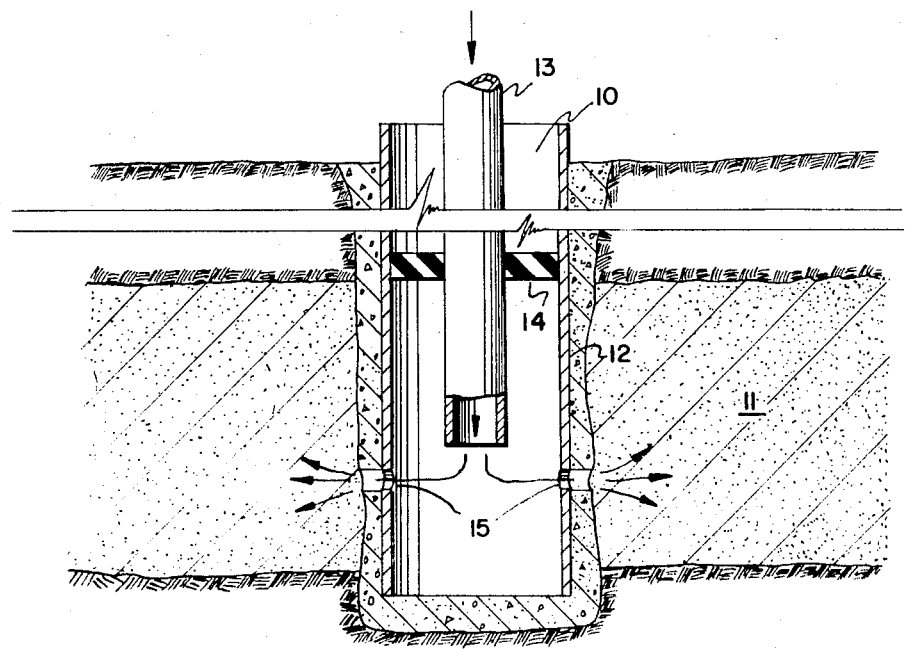
FIG. 1 is a vertical sectional view of a well borehole disposed in an unconsolidated or incompetent earth formation.

Referring now to the drawing, FIG. 1 shows a well borehole 10 extending into an incompetent or unconsolidated formation 11. Well borehole 10 is preferably cased at casing 12 with the casing 12 cemented therein as is well known in the art. A tubing string 13 is preferably disposed in well borehole 10 with tubing string 13 packed off at packer 14 as is also well known in the art. Finally, casing 12 is perforated at perforation 15 so that communication is established between tubing string 13 and the unconsolidated sand in formation 11. Although one such perforation is shown for convenience of illustration, obviously a plurality of such perforations may be formed in casing 12.

Figure 2:
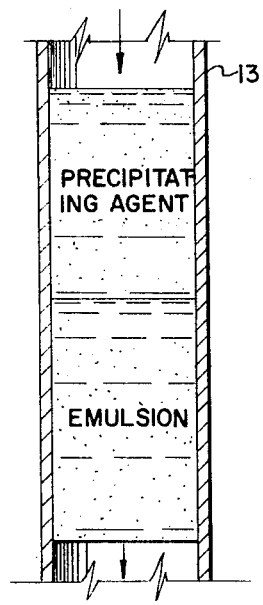
FIG. 2 is a vertical sectional view of a portion of the arrangement of FIG. 1 in accordance with the teachings of our invention.

Formation 11 is consolidated, in accordance with the teachings of our invention, by injection of treating solutions down tubing string 12 from a source (not shown), through perforation 15 and into formation 11 as indicated by the arrows in FIG. 1. More particularly, referring now to FIG. 2, an emulsion of an aqueous solution of alkali metal silicate preferably dispersed in liquid hydrocarbon is injected down tubing string 12 and into the formation. This emulsion may be followed by an injection of a liquid hydrocarbon, such as diesel oil, kerosene, etc. The liquid hydrocarbon is followed by an injection of an aqueous solution containing a silicate precipitator such as an alkaline earth metal salt.

Preferably, the emulsion comprises a "water-in-oil" type emulsion containing waterglass (an aqueous solution of sodium polysilicate) as the suspended phase and, as the continuous phase, a liquid hydrocarbon such as kerosene or diesel oil. This emulsion initially floods the sand pack in formation 11. The preferentially water-wet sand becomes coated with a thin layer of silicate, e.g., water glass. Such emulsions of undiluted water glass in kerosene are, for example, low in viscosity and may be easily handled. An intermediate flush with a liquid hydrocarbon, such as kerosene or any other material immiscible with the emulsion, in a relatively small amount, as for example about one pore volume, may follow the emulsion injection to remove excess emulsion from the sand pack and establish permeability. Subsequently, aqueous precipitating solution, containing as the precipitator an alkaline earth metal chloride, e.g., calcium chloride, is preferably injected to consolidate the sand pack by reaction with the silicate, thus forming an insoluble siliceous precipitate.

The water-wet sand becomes thinly coated by the sodium silicate solution (i.e., the water glass solution) under the conditions set forth hereinabove. The amount of sodium silicate deposited on the sand may be controlled by the concentration and amount of emulsion used. No large amount of intermediate liquid hydrocarbon flushing is required and the subsequent reaction with the calcium chloride solution produces no objectionable nonadherent precipitate.

EXAMPLE

A 7:3 emulsion of kerosene-water glass was formed using a water-soluble surfactant of 0.5 percent Triton GR-7, an alkylphenol-alkylene oxide condensation product manufactured by the Rohm and Haas Company. About one pore volume of this emulsion was flowed through a sand pack. The sand pack was then consolidated by flowing about one pore volume of 20 weight percent aqueous calcium chloride solution through it. A precipitate-free, highly permeable consolidated sand was formed.

The techniques described hereinabove permit a unique degree of control over the amount of water glass deposited on the sand pack resulting in an improved method of consolidating incompetent formations. Thus, inexpensive and effective sand consolidation is possible based on the teachings of our invention.

We claim as our invention:

1. A method of consolidating an unconsolidated sand disposed in an incompetent earth formation comprising the steps of:
   injecting into said formation an emulsion comprising an aqueous solution of an alkali metal silicate dispersed in liquid hydrocarbon;
   injecting into said formation a liquid hydrocarbon following the injection of said emulsion; and
   injecting into said formation an aqueous solution of an alkaline earth metal salt following the injection of said liquid hydrocarbon.

2. The method of claim 1 wherein the step of injecting an emulsion into said formation includes the step of injection a water-in-oil emulsion containing an aqueous solution of sodium polysilicate as the suspended phase and an oil as the continuous phase.

3. The method of claim 2 wherein the step of injecting an emulsion containing an oil as the continuous phase into said formation includes the step of injecting kerosene as the continuous phase.

4. The method of claim 1 wherein the step of injecting a liquid hydrocarbon into said formation includes the step of injecting a relatively small amount of kerosene into said formation.

5. The method of claim 1 wherein the step of injecting an aqueous solution of an alkaline earth metal salt into said formation includes the step of injecting an aqueous calcium chloride solution into said formation.

6. The method of claim 1 wherein:
   the step of injecting an emulsion into said formation includes the step of injecting a 7:3 emulsion formed of kerosene-sodium polysilicate using a 0.5 percent water-soluble surfactant; and
   the step of injecting an aqueous solution of an alkaline earth metal salt into said formation includes the step of injecting a 20 weight percent aqueous calcium chloride solution.

7. A method of consolidating a porous unconsolidated preferentially water-wet sand disposed in an incompetent formation to form a permeable consolidated medium which method comprises the steps of:
   thinly coating the sand with an aqueous solution containing an alkali metal silicate by injecting into the formation an emulsion comprising the aqueous solution containing an alkali metal silicate dispersed in a liquid hydrocarbon; and thereafter,
   injecting into the formation an aqueous solution containing a silicate precipitator whereby the silicate precipitator reacts with the alkali metal silicate to precipitate a thin coat of siliceous material on the sand to consolidate the sand into a permeable consolidated medium.